No. 836,158. PATENTED NOV. 20, 1906.
A. L. WEEKS.
WHIP MANIPULATOR.
APPLICATION FILED MAR. 9, 1906.
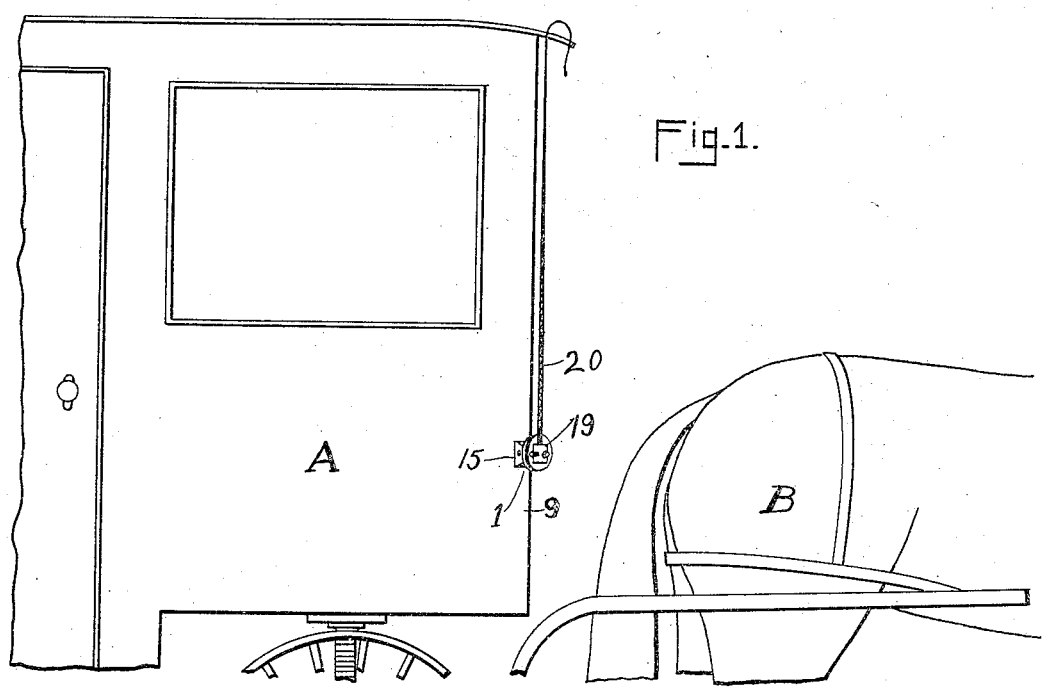
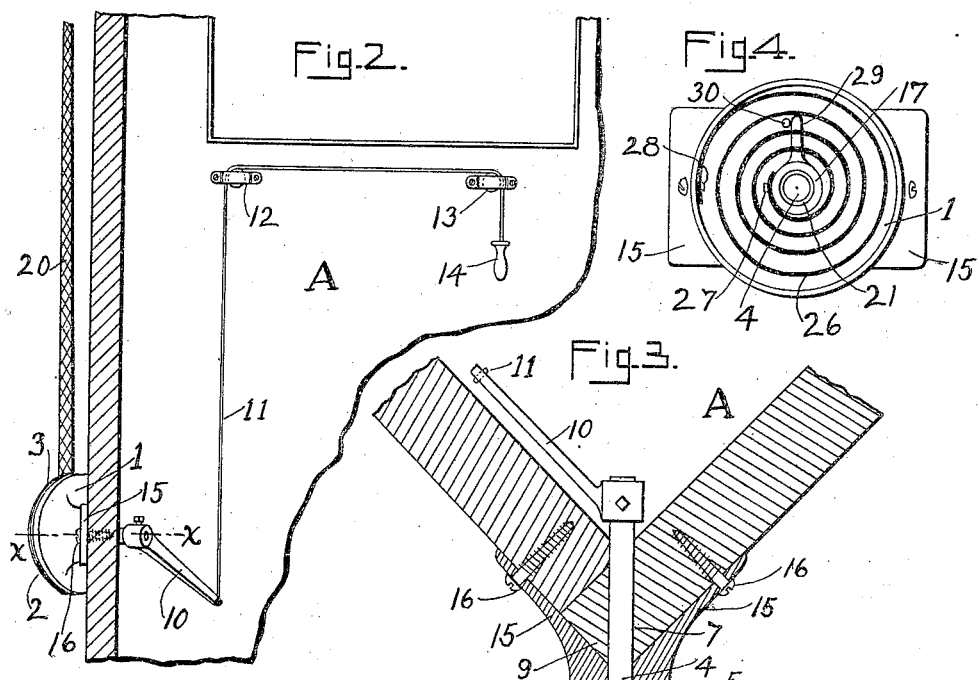

UNITED STATES PATENT OFFICE.

ABRAHAM LINCOLN WEEKS, OF HARRISON, INDIANA.

WHIP-MANIPULATOR.

No. 836,158.  Specification of Letters Patent.  Patented Nov. 20, 1906.

Application filed March 9, 1906. Serial No. 305,072.

*To all whom it may concern:*

Be it known that I, ABRAHAM LINCOLN WEEKS, a citizen of the United States, residing at Harrison, in the county of Dearborn and State of Indiana, have invented certain new and useful Improvements in Whip-Manipulators, of which the following is a specification.

It is the object of my invention to provide a new and useful whip-manipulator which is especially useful on closed vehicles and is particularly efficacious in rural-mail-delivery wagons, in which usually the front of the vehicle is closed, with a door at the side only; and the invention will be readily understood from the following description and claim and from the drawings, in which latter—

Figure 1 is a perspective view of my improved device attached to a vehicle, the latter being broken away. Fig. 2 is an interior view of the vehicle, broken away, showing my improved device in position for use. Fig. 3 is a cross-section of the same on the line $x\ x$ of Fig. 2, and Fig. 4 is a front elevation of my improved device with the cover of the casing removed.

A represents a vehicle, and B a horse.

1 is a casing having a cover 2 adapted to be screwed on the casing by means of threads 3. A shaft 4 is journaled in bearing 5 in said casing and in bearing 6 in said cover, the shaft projecting through an aperture 7 in the body of the vehicle, the said aperture extending diagonally through the body at the corner 9 of the vehicle. An arm 10 is secured to said shaft and has a rope 11 or other flexible connection secured thereto, the rope taking over pulleys 12 13, secured to the vehicle-body, and having a handle 14 for manipulation. The casing is secured to the body of the vehicle by means of flanges 15, extending at right angles from each other, screws 16 securing said flanges to the vehicle.

The shaft is longitudinally positioned in the casing by having an enlargement 17, against which the bearings 5 6 take. The shaft also has an extension 18, projecting outside the casing, to which a whip-socket 19 is secured for supporting a whip 20. The socket is secured, preferably, by reducing the extension 18 in diameter for forming a shoulder 21, between which and a nut 22 the whip-socket is clamped on said reduced end, the reduced end taking through a bore 23 in said whip-socket. The whip-socket, which preferably has a bottom 19' for supporting the whip, is also provided with a set-screw 24 for securing the whip in place in the whip-bore of the socket, said whip-bore being sufficiently large to accommodate different sizes of whips. The whip is caused to descend upon the horse's back or haunches by the manipulation of the arm 10, and in order to bring the whip back to normal position a coil-spring 26 is provided within the casing, taking about the enlargement 17, to which it is secured over a pin 27, the other end of the spring taking over a pin 28 on the casing. An arm 29 projects from the shaft and takes against a lug 30 on the casing for forming a stop for limiting the return of the whip and normally holding the whip in upright position.

It will be noted that by means of my improved device the whip can be brought across the horse's back or haunches from inside the vehicle in a diagonal direction with relation to the vehicle and horse, thereby obviating the necessity of the driver reaching out from the side of the vehicle in order to whip up the horse. The whip-manipulator is simple and compact and is easily attached to any vehicle. The casing is water-tight and keeps the spring clean, thereby lengthening the life of the device.

Having thus fully described my invention, what I claim as new, and desire to secure by Letters Patent, is—

In a whip-manipulator, the combination of a casing, a shaft journaled therein, a coil-spring taking about said shaft and secured to said shaft and said casing, an arm for rocking said shaft, said shaft having an extension outside said casing, and a whip-socket secured to said extension, said whip-socket having a whip-bore for receiving the whip, said shaft further having a projection and said casing having a lug inside said casing against which said projection takes for normally holding the whip-bore of said whip-socket in upright position, substantially as described.

In testimony whereof I have subscribed my name hereto in the presence of two subscribing witnesses.

ABRAHAM LINCOLN WEEKS.

Witnesses:
 CHARLES W. ROCKAFELAR,
 CORDELIA O'HEARN.